(12) United States Patent
Nyberg

(10) Patent No.: US 9,670,869 B2
(45) Date of Patent: Jun. 6, 2017

(54) PISTON AND CONNECTING ROD ASSEMBLY

(76) Inventor: Peter Nyberg, Borlänge (SE)

( * ) Notice: Subject to any disclaimer, the term of this patent is extended or adjusted under 35 U.S.C. 154(b) by 52 days.

(21) Appl. No.: 14/355,880

(22) PCT Filed: Sep. 7, 2012

(86) PCT No.: PCT/SE2012/050945
§ 371 (c)(1),
(2), (4) Date: Jul. 3, 2014

(87) PCT Pub. No.: WO2013/070142
PCT Pub. Date: May 16, 2013

(65) Prior Publication Data
US 2014/0345561 A1   Nov. 27, 2014

(30) Foreign Application Priority Data
Nov. 11, 2011   (SE) ...................................... 1151072

(51) Int. Cl.
| F02B 75/32 | (2006.01) |
| F02F 3/00 | (2006.01) |
| F16J 1/16 | (2006.01) |
| F16J 7/00 | (2006.01) |
| F16J 1/00 | (2006.01) |

(52) U.S. Cl.
CPC .......... *F02F 3/0015* (2013.01); *F02F 3/0069* (2013.01); *F16J 1/006* (2013.01); *F16J 1/16* (2013.01); *F16J 7/00* (2013.01)

(58) Field of Classification Search
CPC ..... F02B 75/32; F04B 39/0022; F02F 3/0069; F02F 3/0015; F16J 1/16

USPC ...................... 123/197.1, 197.3; 92/187, 189
See application file for complete search history.

(56) References Cited

U.S. PATENT DOCUMENTS

| 876,636 A | 1/1908 | Harder |
| 1,789,089 A | 1/1931 | Tobler |
| 4,617,887 A * | 10/1986 | Nagase ............... F02B 23/0672 123/193.6 |
| 5,029,562 A | 7/1991 | Kamo |
| 2004/0211314 A1 * | 10/2004 | Bousseau ................. B21K 1/18 92/187 |

FOREIGN PATENT DOCUMENTS

| DE | 254049 A1 | 2/1988 |
| JP | 6059867 U | 4/1985 |
| WO | 2012078093 A1 | 6/2012 |
| WO | WO 2012078093 A1 * | 6/2012 |

\* cited by examiner

*Primary Examiner* — Stephen K Cronin
*Assistant Examiner* — Omar Morales
(74) *Attorney, Agent, or Firm* — Capitol City TechLaw

(57) ABSTRACT

An assembly for a combustion engine may include a piston and a connecting rod. The piston may include a piston crown, a piston skirt, and respective portions for accommodating a piston pin through which the piston is intended to be supported on the connecting rod. The piston skirt may have a completely closed bottom part and apertures may be provided in the portion for accommodating the piston pin. The apertures may seal against the piston pin to enclose a bottom part of the piston crown as well as the piston crown portion for accommodating the piston pin. The connecting rod may have a fork shape in an end facing the piston.

10 Claims, 4 Drawing Sheets

A-A

B-B

PISTON AND CONNECTING ROD ASSEMBLY

TECHNICAL FIELD

The invention relates generally to combustion engines and specifically concerns an assembly including a piston and a connecting rod and being adapted to work at high temperatures.

BACKGROUND

The design of combustion chambers and pistons for combustion engines has in one respect focused primarily on reducing the load on the actual cylinder and on the piston with associated piston rings, oil rings and piston pins moving therein. This has often been done by using different cooling arrangements for effectively leading off heat from said parts and thereby lowering their working temperature. The purpose has been to reduce the actual temperature load on the parts and to reduce problems arising due to the different degree of heat expansion of the different relatively moving, cooperating parts, i.e. primarily between piston/piston rings and cylinder bore.

In another respect efforts have been made to configure combustion engine combustion chambers and pistons so that combustion work may without negative consequences be performed at very high temperatures. The purpose thereof has been to increase engine efficiency by reducing heat losses and to improve combustion and thereby lower the fuel consumption and to a certain degree obtain a reduction of pollutions. Such elevated temperatures could otherwise, as a consequence of heat expansion phenomena, cause damage to the pistons and to their piston rings. To avoid such problems a divided piston configuration has for instance been suggested, having a heat insulation gap between a part forming the piston crown and being exposed to the highest temperatures and a piston skirt supporting the piston rings. By employing the gap between these piston parts and by providing special seals therein it is possible to eliminate or at least subdue the effect of different heat expansion between the piston crown portion and its skirt portion. Often, different materials are also used for these parts, so that e.g. the piston crown portion is made of steel and the piston skirt of an aluminum alloy.

SUMMARY

A general object of the invention is thus to eliminate or at least reduce the above discussed problems.

A more specific object of the invention is to provide an improved piston and connecting rod assembly for combustion engines, which is adapted for high working temperatures.

Other specific objects of the invention are to provide a piston and a connecting rod, respectively, for use in such a piston and connecting rod assembly.

These and other objects are met by the invention as defined by the accompanying claims.

The invention relates generally to an assembly for combustion engines and including a piston and a connecting rod. The piston has a piston crown, a piston skirt and portions thereof accommodating a piston pin by means of which the piston crown and the piston skirt are supported on the connecting rod. In a basic configuration the piston skirt has a completely closed bottom portion and in its portion for accommodating the piston pin it also has apertures sealing against the latter. Moreover, the piston skirt completely encloses a bottom portion of the piston crown as well as the portion thereof accommodating the piston pin. Finally, the connecting rod has a fork shape in its end facing the piston.

According to other aspects of the invention it provides an appropriate piston and an appropriate connecting rod, respectively, that are adapted for use in a piston and connecting rod assembly according to the invention.

Basic configurations of the piston and connecting rod assembly according to the invention provide the advantages of:

reduced heat transfer between piston crown and hot engine oil; and thereby
increased useful life of the engine oil;
reduced coking phenomena at the lower piston surfaces;
reduced fuel consumption through more complete combustion; and
few component parts of the assembly.

Further developments of the invention and embodiments thereof are stated in the subclaims.

Other advantages of the invention will be readily appreciated upon reading the below detailed description of embodiments of the invention.

BRIEF DESCRIPTION OF THE DRAWINGS

The invention and its further objects and advantages will be best understood by reference to the following description taken together with the accompanying drawings, in which.

DETAILED DESCRIPTION

Figure 1:
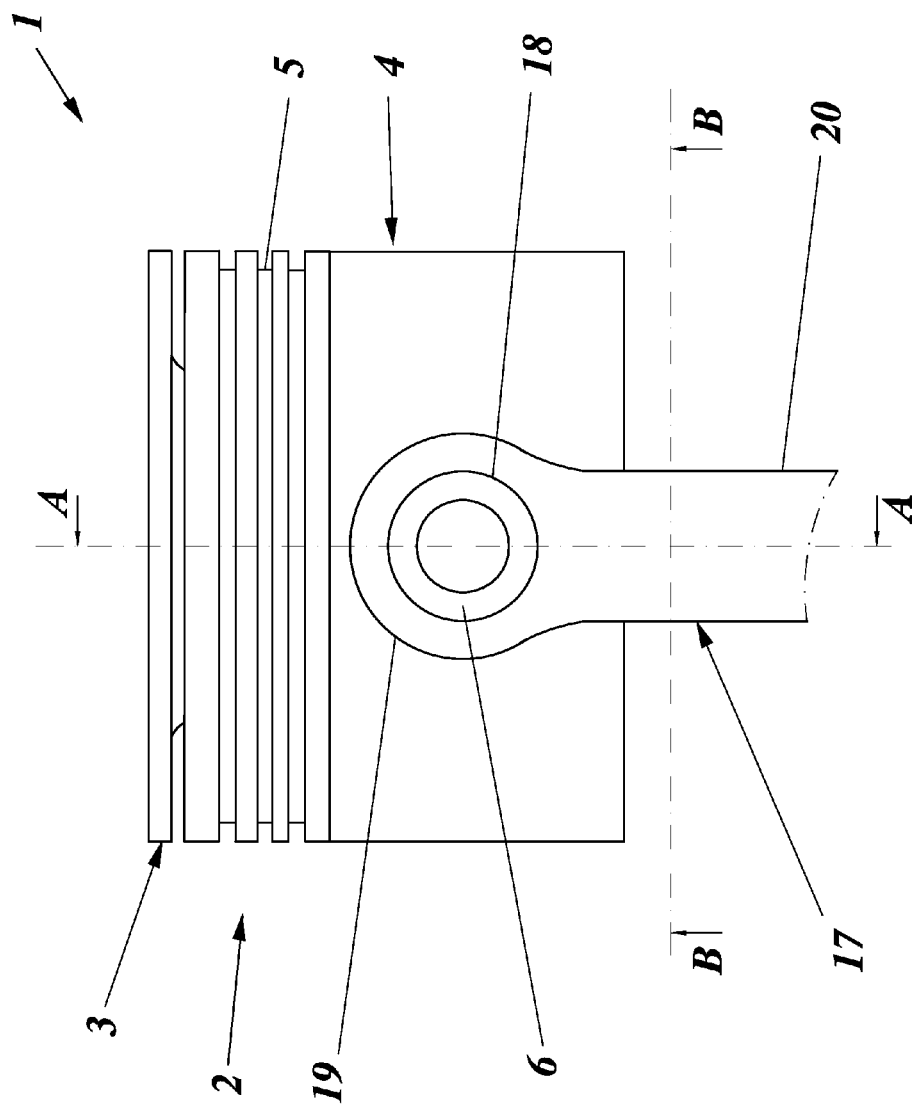
FIG. 1 is a side view of an embodiment of a piston with connecting rod according to the invention.

The invention and its principles are explained below with reference to exemplary embodiments of a piston and connecting rod assembly as well as a piston and a connecting rod, respectively, for such an assembly. These embodiments are illustrated partly schematically in the accompanying drawing FIGS. 1-4 and relate to an application of the basic principles of the solution according to the invention to a two-part piston for combustion engines, which is previously known in its basic configuration. The illustrated configurations are given as an example of such an application and it shall be emphasized that the illustrations have the sole purpose of disclosing preferred embodiments. Thus, they are not intended to limit the invention to specific applications or to the details illustrated in the drawings.

Referring back to the introductory discussion it is clear that many of the problems appearing by engines that are intended to work at increased temperatures depend upon heat expansion phenomena, coking problems and effects resulting therefrom. The invention aims at finding solutions to these problems by suggesting a new piston and connecting rod combination that permits the elimination of heat and coking problems in a completely new manner. Basically, these solutions involve protecting the hottest portion of the piston, i.e. the piston crown and especially its underside, from contacting the oil in the engine. A basic feature of these solutions is a specific configuration of the underside of the piston skirt having a closed bottom portion that effectively protects the underside of the piston crown.

As was mentioned above, the accompanying drawings illustrate an assembly 1 for a combustion engine and including a piston 2 and a connecting rod 17. The piston 2 is of a two-part type where the piston crown 3 and the piston skirt 4 are separate parts. The piston crown 3 and the piston skirt 4 both have support portions 10 and 14, respectively, for accommodating a piston pin 6 that is schematically shown in the drawing figures. By means of the piston pin 6 the piston crown 3 and the piston skirt 4 are intended to be pivotally supported in relation to the connecting rod 17 that is only partially shown in the drawing figures. Such a piston 2 is especially suitable for use in engines with higher working temperatures. This is partly due to the fact that it permits the use of different specifically adapted materials in the crown 3, which is subjected to the highest temperatures, and the skirt 4 that at its outer circumference has grooves 5 for accommodating conventional, not specifically shown piston rings. As was indicated before, the different materials of the various parts may be e.g. steel in the crown 3 and aluminum alloy in the skirt 4. A gap 8 between the different portions, which gap is sealed by means of a suitable sealing arrangement 7, also contributes to the temperature resistance of the assembly 1. The sealed gap 8 secures that the heat expansion of the piston crown 3, which is subjected to the highest temperatures, is not transferred to the piston skirt 4. This is important in order not to overload the piston rings. By taking up the temperature movements of the piston crown 3 in the gap 8 it will be possible to prevent the piston rings, which sealingly engage an engine cylinder wall (not shown) of the engine, from seizing up or jamming against this cylinder wall.

The piston crown 3 is basically built up of a generally disc shaped upper part 9 that continues into its portion 10 for accommodating the piston pin 6, which in turn continues uninterrupted into a downwardly completely closed bottom part 12. The piston crown portion 10 is preferably sealingly supported on the piston pin 6, which is accommodated therein, by means of a through bore 11 extending transversely therethrough. To avoid problems caused by temperature differences and consisting of bearing play, the piston crown 3 is e.g. connected to the piston pin 6 by press fit connection. It is further clear, especially from FIGS. 2-4, that in the illustrated example the piston crown portion 10 for accommodating the piston pin 6 is also basically formed having a general circular cylinder shape with a smaller diameter than that of its upper disc shaped part 9. Portions on opposite sides of the circular cylinder shape are removed such that the portion 10 of the piston crown 3 that accommodates the piston pin 6 in cross section has a generally rectangular shape with rounded short sides corresponding to the outer circumference of the cylinder shape. The bore 11 is formed transversely through the portion 10 and opens at the sides formed by the removed portions of the cylinder shape.

The piston skirt 4 basically includes an upper part 13 that is upwardly completely open, has a general cylinder shape and at its outer circumference has said piston ring grooves 5. The upper part 13 continues uninterrupted into the piston skirt 4 portion 14 for accommodating the piston pin 6 and then into a downwardly completely closed bottom part 15. All of these piston skirt 4 parts as well as all of the described piston crown 3 parts are preferably formed in one piece. The piston pin 6 support portion 14 is thereby configured having apertures 16 extending through the outer wall of the piston skirt 4 for sealing against the piston pin 6 and being provided diametrically opposite to each other. The support or journal for the piston pin 6 in the piston skirt 4 may be configured in any conventional and to the skilled practitioner well known manner, securing an outward seal against engine oil in a surrounding, not illustrated cylinder. It has therefore not been specifically shown in the drawing figures. Just as for the piston crown 3 the piston skirt 4 portion 14 for accommodating the piston pin 6 is basically formed having a general circular cylinder shape that in this case is the same as for the upper part 13. Portions on opposite sides of the circular cylinder shape are also removed here, so that the piston pin 6 accommodating portion 14 in cross section has a generally rectangular shape with rounded short sides corresponding to the outer circumference of the cylinder shape.

Moreover, the piston skirt 4 with its piston pin 6 accommodating portion 14 and its closed bottom part 15 completely encloses the bottom part 12 of the piston crown 3 as well as its piston pin 6 accommodating portion 10. Oil from the engine is thereby effectively prevented from contacting the different piston crown 3 parts and portions and from being overheated by them. Specifically, the parts 13, 15 and the portion 14 of the piston skirt 4 are adapted to the shape of the corresponding parts 9, 12 and portion 10 of the piston crown 3. When mounted on the piston pin 6 the piston crown 3 and the piston skirt 4 form a substantially uninterrupted or continuous heat insulating gap 8 there between. The gap 8 is formed between outer surfaces of the upper part 9 of the piston crown 3, its portion 10 for accommodating the piston pin 6 and its closed bottom part 12 and inner surfaces of the upper part 13 of the piston skirt 4, its portion 14 for accommodating the piston pin 6 and its closed bottom part 15. The gap thus promotes heat insulation against the bottom side of the piston crown 3 that is normally the hottest surface of the piston 2. Thereby, heat transfer between the piston crown 3 and piston skirt 4 material may not occur or may at least be greatly reduced.

At the upper area of the upper part 13 of the piston skirt 4 the gap 8 between piston crown 3 and piston skirt 4 is preferably sealed by means of a seal 7 that is supported in a groove at an outer surface of the piston pin 6 accommodating portion 10 of the piston crown 3. Although the gap 8 between piston crown 3 and piston skirt 4 is illustrated in the drawing figures having a certain width, it shall be obvious that depending upon the application this gap 8 may be configured having a greater or smaller width than that illustrated. A wider gap may e.g. be used for very high working temperatures, in order to effectively prevent heat transfer from piston crown 3 to piston skirt 4. On the other hand a narrower gap may be a possibility when a restricted space is available in the piston 2 and also in order to reduce undesirable movement between piston crown and piston skirt. Anyway, the gap may appropriately be narrower at the top, between the upper parts of the piston crown and the piston skirt than at the lower parts thereof.

Figure 2:
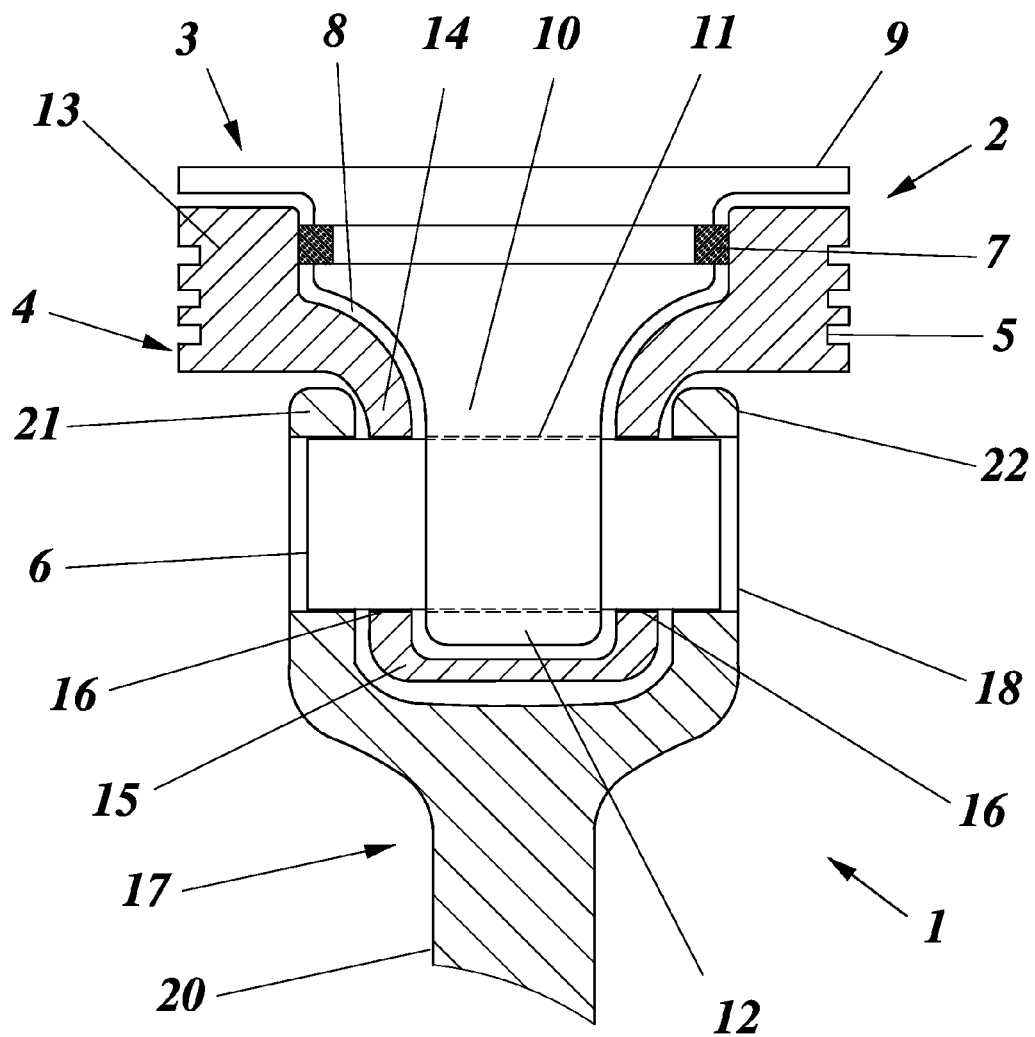
FIG. 2 is a longitudinal section through the piston with connecting rod according to the invention and as shown in FIG. 1, along a first line A-A indicated in FIG. 1.
Figure 3:
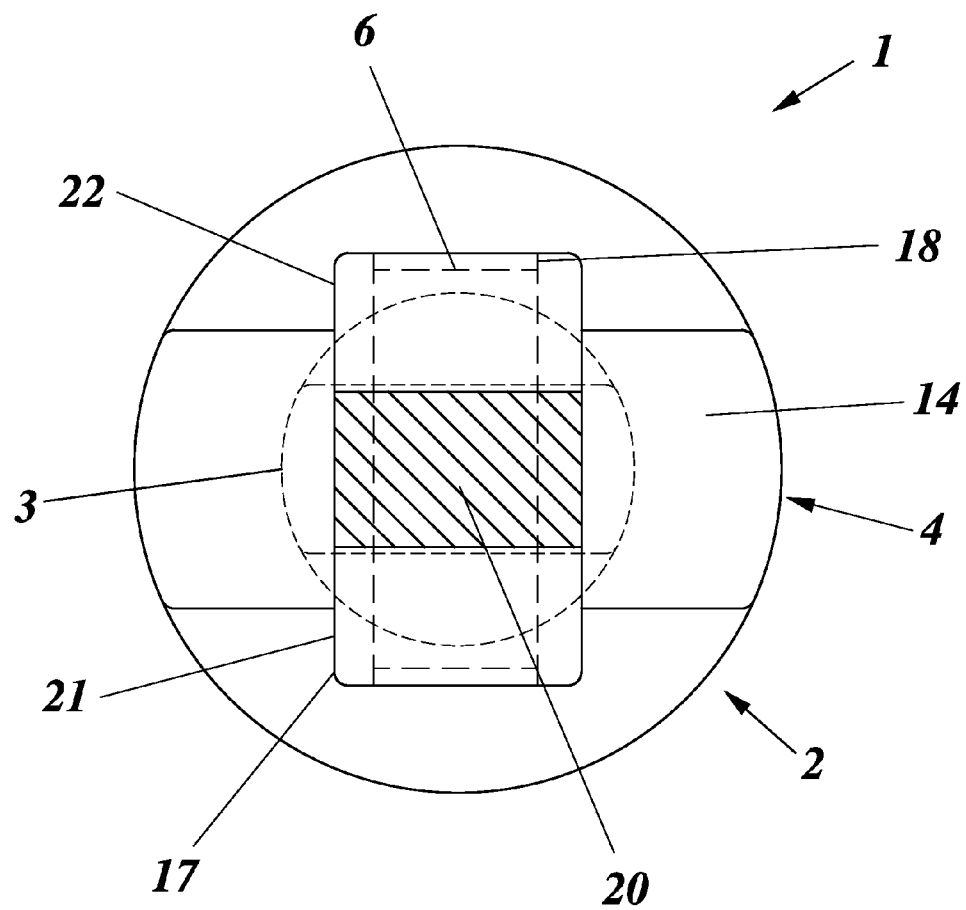
FIG. 3 illustrates the embodiment of the piston with connecting rod according to the invention and as shown in FIG. 1 och 2, in a section along a second line B-B through the connecting rod of FIG. 1.
Figure 4:
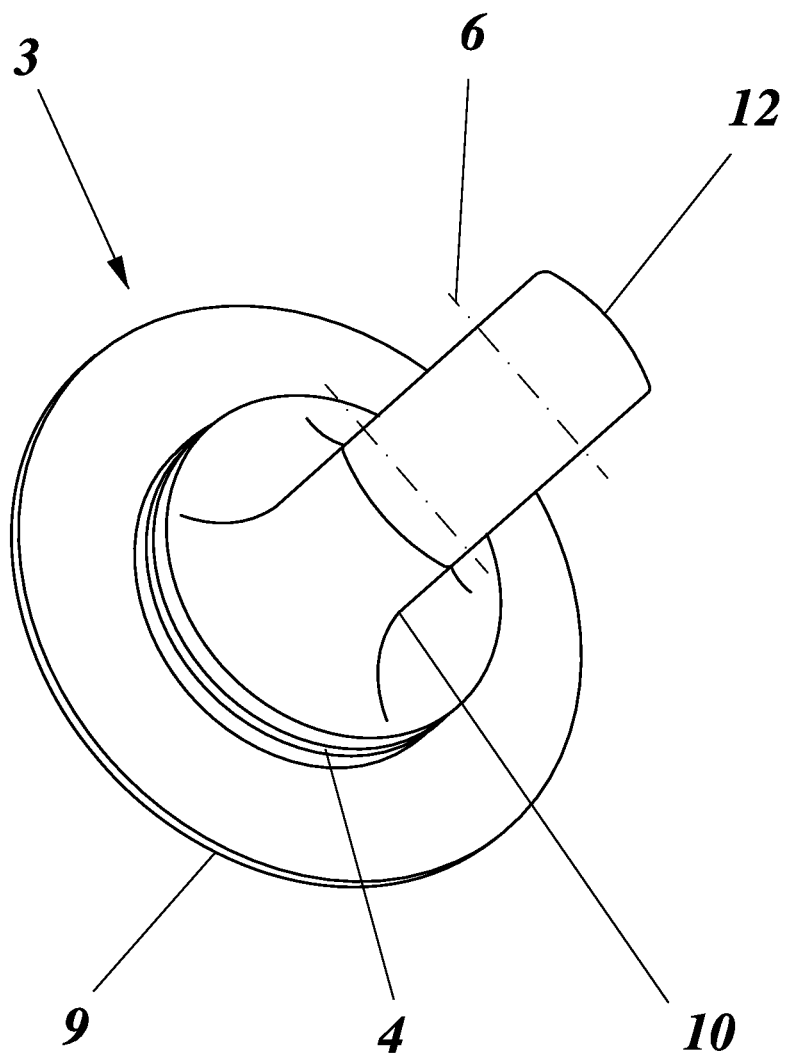
FIG. 4 is a schematical perspective view from below of the piston crown in the piston according to FIGS. 1-3.

It is clear from FIGS. 1-3 that the assembly 1 employs a specifically configured connecting rod 17 that has a fork shape in its end 19 facing the piston 2. The fork shape is formed by two spaced fork prongs 21, 22 that start from the connecting rod 17 main portion 20 that is partially shown in the drawings. The opposite end of the main portion 20 is not shown here but has a quite conventional structure for journalling on a likewise not shown crank shaft. In the example the fork prongs 21, 22 are two spaced ears each having a substantially central bore 18 for supporting the piston pin 6. In the assembled condition the fork prongs/ears 21, 22 from opposite sides grasp the closed bottom part 15 of the piston skirt 4 and its portion 14 accommodating and sealing against the piston pin 6. In this condition the connecting rod 17 with its fork shaped end 19 that faces the piston 2, i.e. the end having the spaced fork prongs/ears 21, 22, also from opposite sides grasps the closed bottom part 12 of the piston crown 3 and its portion 10 accommodating and sealing against the piston pin 6.

The piston pin 6 extends completely through the aligned bores 11, 16 in the piston crown 3 and the piston skirt 4, respectively, and at least partially through the bores 18 in the spaced fork prongs 21, 22 of the fork shaped end 19.

The choice of material in the parts of the piston 2 depends partly on the intended application but as was mentioned above, the piston crown 3 should generally be manufactured from steel or another heat resistant material whereas the piston skirt 4 advantageously may contain a lighter material, such as aluminum. Furthermore, the piston crown 3 may be homogenous, as in the illustrated embodiment. In applications where a reduced weight is desirable the piston crown 3, or in particular its portion 10 and to some degree its bottom part 12 may alternatively have a hollow shape.

With such an inventive piston and connecting rod assembly 1 the set goals are achieved, namely that the piston 2, and in particular the bottom side of the piston crown 3, is protected from "coking", i.e. that oil reaches and is burns onto it. With this configuration the working temperature of the piston 2 may also be raised, which provides for an improved combustion and lower fuel consumption. Since oil in the engine does not cool the hottest part of the piston 2, i.e. the piston crown 3, the engine oil may also preserve its quality during extended operating hours. By fitting the piston skirt 4 to the piston pin by means of its support portion 14 that in the assembled condition sealingly connects to the piston pin 6 the latter, and especially its portions that are supported in the actual piston crown 3 and piston skirt 4, may also be protected from the influence of hot oil. The purpose thereof is likewise to effectively seal so that hot oil may not enter the gap 8 between the piston skirt 4 and the bottom side of the piston crown 3.

In alternative, but not specifically illustrated embodiments of the invention variants or modifications of the different illustrated parts thereof may be used without departing from the scope of the invention. Above all, the invention is not limited to the illustrated and described, schematical design of the two-part piston. Although it may presently be assumed that the invention will have its major area of application in engines that are specifically intended to operate at higher temperatures, the invention in its broadest scope covers also variants and modifications of such a piston where its characterizing features provide the same basic functions and advantages as those described above. An example of this may be another configuration of the complementary interfitting parts of the piston crown and piston skirt.

Although the invention has been disclosed with specific reference to an application intended specifically for relatively low speed four-stroke engines for heavy vehicles, the invention shall in no way be restricted to such specific applications. The basic principles of the invention may thus be applied to other types of engines and for other types of vehicles.

The invention has been described in connecting with an embodiment that is presently considered to be most practical and appropriate but it shall be understood that the invention is not limited to the disclosed embodiment. It also covers any practically feasible combination of features that have been illustrated and/or described herein and is thus intended to cover various modifications and equivalent arrangements included within the spirit and scope of the appended claims.

The invention claimed is:

1. An assembly for a combustion engine, comprising:
a piston that includes
a piston crown with a first support portion, and
a piston skirt with a second support portion; and
a connecting rod;
the first and the second support portions accommodating
a piston pin by which the piston crown and the piston skirt are pivotally supported on the connecting rod;
wherein the piston skirt has a completely closed bottom part;
wherein the second support portion of the piston skirt has apertures, each aperture defined by a wall of the second support portion that extends all the way around the piston pin and seals against the piston pin, such that a bottom part of the piston crown and the first support portion of the piston crown are completely enclosed; and
wherein the connecting rod has a fork shaped end facing the piston.

2. The assembly according to claim 1, wherein the fork shaped end of the connecting rod has spaced apart fork prongs that grasp from opposite sides the closed bottom part of the piston skirt and the second support portion of the piston skirt.

3. The assembly according to claim 2, wherein the spaced apart fork prongs grasp from opposite sides the bottom part of the piston crown and the first support portion of the piston crown; and
wherein the piston pin extends completely through the first support portion of the piston crown, and through the second support portion of the piston skirt, and at least partly through the spaced apart fork prongs of the connecting rod.

4. The assembly according to claim 1, wherein a continuous heat insulating gap is formed between outer surfaces of an upper part of the piston crown, the first support portion of the piston crown, and the bottom part of the piston crown, and inner surfaces of an upper part of the piston skirt, the second support portion of the piston skit, and the closed bottom part of the piston skit.

5. The assembly according to claim 4, wherein a seal is supported at an outer surface of the piston crown for sealing the gap between the piston crown and the piston skirt.

6. The assembly according to claim 1, wherein the bottom part of the piston crown is completely closed; and
wherein the first support portion of the piston crown has a through bore extended transversely therethrough and sealing against the piston pin being accommodated therein.

7. The assembly according to claim 1, wherein the piston crown one of
is homogenous, and
has an at least partly hollow shape in the bottom part and in the first support portion for accommodating the piston pin.

8. A piston comprising:
a piston crown with a first support portion; and
a piston skirt with a second support portion;
the first and the second support portions accommodating
a piston pin by which the piston crown and the piston skirt are pivotally supportable on a connecting rod;
wherein the piston skirt has a completely closed bottom part;

wherein the closed bottom part of the piston skirt continues uninterrupted into the second support portion of the piston skirt; and wherein the second support portion of the piston skirt has apertures, each aperture defined by a wall of the second support portion that extends all the way around the piston pin and seals against the piston pin, such that a bottom part of the piston crown and the first support portion of the piston crown are completely enclosed.

9. The piston according to claim 8, wherein the bottom part of the piston crown is completely closed;

wherein the bottom part of the piston crown continues uninterrupted into the first support portion of the piston crown; and wherein the first support portion has a through bore extending transversely therethrough and sealing against the piston pin being accommodated therein.

10. A connecting rod for the assembly according to claim 1, the connecting rod comprising:

an end that in an assembled condition faces a piston;

wherein the end has a fork shape with spaced apart fork prongs for grasping from opposite sides parts and portions of the piston.

\* \* \* \* \*